Dec. 4, 1951   K. T. BAINBRIDGE   2,577,502
DIRECTIONAL RADAR SYSTEM
Filed Oct. 19, 1945
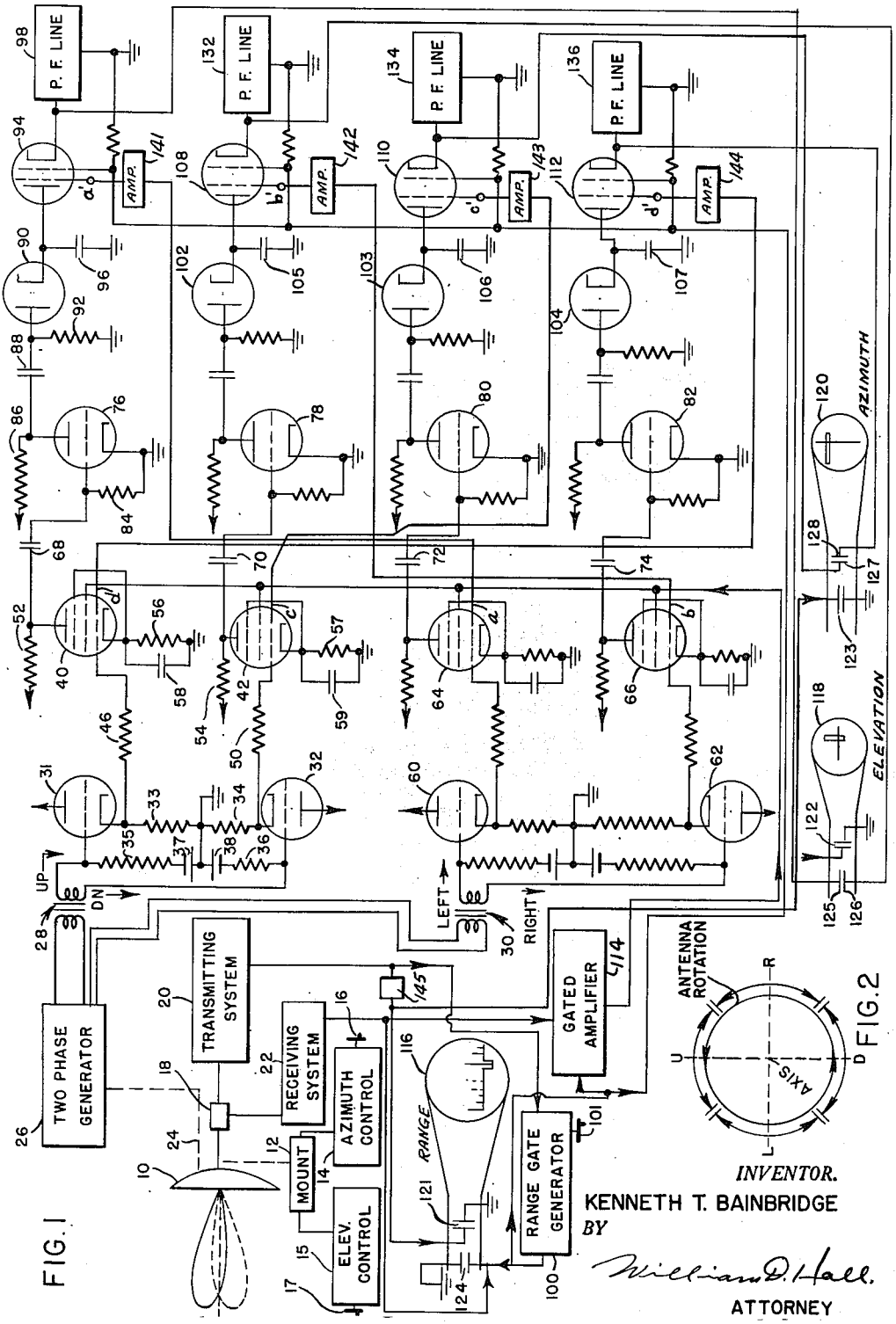
INVENTOR.
KENNETH T. BAINBRIDGE
BY
William D. Hall.
ATTORNEY Patented Dec. 4, 1951

2,577,502

UNITED STATES PATENT OFFICE 2,577,502

DIRECTIONAL RADAR SYSTEM

Kenneth T. Bainbridge, Santa Fe, N. Mex., assignor, by mesne assignments, to the United States of America as represented by the Secretary of War Application October 19, 1945, Serial No. 623,407

7 Claims. (Cl. 343—11)

This invention relates generally to electrical circuits and more particularly to an integrating circuit for use with a radio object detection apparatus.

In one type of radio object locating system, pulses of electromagnetic energy are sent out from a directive antenna, so that the strongest echoes are received from a given target when the antenna axis is pointed toward it in elevation and azimuth. The distance or range to the target is measured by the interval of time which elapses between the transmitted and received pulses, and by observing this time and the position of the antenna which gives maximum response the position of the target may be accurately determined.

A modification of the above system employs a directive beam of radio energy having its axis displaced by a small angle from the axis of the antenna itself. This beam is then caused to rotate in such a way that its axis generates a symmetrical cone about the axis of the antenna. This method of beam rotation is known as conical scanning. The amplitude of the echo pulses from the target will vary as the beam rotates unless the target is directly on the axis of the antenna, in which case the beam axis is always displaced from the target by the same amount and the returning echo pulses are constant in amplitude neglecting random fluctuations. If the target is not on the antenna axis the direction of its displacement may be determined from the portion of the beam rotation cycle during which the strongest echo pulses appear.

The maximum range of a radio object locating system is determined mainly by the intensity of the transmitted signals and the sensitivity of the receiving portion of the system. Receiving systems are limited in sensitivity by a number of factors, among them being receiver gain, noise level, and the type of indication employed. Increasing the receiver gain beyond certain limits introduces noise, which offsets the effect of increased gain.

It is therefore an object of this invention to provide means for increasing the sensitivity of a pulse receiving and indicating system without producing increased interference from noise. It is a further object to adapt this means so that it produces from a series of received pulses a single pulse having a wave form well adapted for presentation on a cathode ray indicator tube. It is another object of this invention to apply these latter pulses to an indicating system in such a way that they will give information as to the proper orientation of an antenna in order for it to point directly at a selected target.

In general the invention includes an integrating circuit which periodically stores the energy in several successive received pulses and then forms a single pulse from such energy which is applied to the indicator. Means are provided for applying only the pulses from a selected target to the storage circuit and for applying the output pulses from the storage circuit to an indicating means in such a manner that it is possible to determine therefrom the proper position of the antenna in order for it to receive an optimum signal from the given target.

Further objects, features, and advantages of this invention will suggest themselves to those skilled in the art and will become apparent from the following description of the invention taken in connection with the accompanying drawing in which:

Fig. 1 is a schematic diagram of a system embodying the principles of the present invention; and Fig. 2 is a diagram representing the rotary scanning motion of the beam from the antenna of a system employing conical scanning as described above.

Reference is now made more particularly to Fig. 1 in which a conical scanning antenna 10 is supported on a mount 12. The azimuth and elevation of the antenna may be controlled by an azimuth control 14 and elevation control 15 by means of handwheels 16 and 17 respectively. Antenna control systems of this type are well known in the art and need not be described in further detail here. Antenna 10 is connected through a duplexing device 18 to the transmitting system 20 and the receiving system 22. Duplexing device 18 may be of any type common in the art and is a switch serving to protect the receiver from overload when pulses are transmitted and to prevent pulses from passing to the transmitter when they are being received. Antenna 10 is connected by a shaft 24 to a two-phase generator 26 which is caused to rotate in conjunction with the rotating beam from the antenna. Generator 26 has two windings so oriented that they produce voltages which are 90° out of phase with each other. These two voltages are applied to the primary coils of transformers 28 and 30 respectively. The two ends of the secondary coil of transformer 28 are connected to the grids of cathode follower tubes 31 and 32 respectively. These cathode followers have cathode load resistors 33 and 34 and grid resistors 35 and 36. The grids of cathode followers 31 and 32 are biased by grid bias supplies 37 and 38 respectively. Pentodes 40 and 42 are gated amplifiers, to the control grids of which are applied the output voltages from cathode followers 31 and 32 through resistors 46 and 50 respectively. Resistors 52 and 54 are the plate load resistors of pentodes 40 and 42 respectively. Resistors 56 and 57 are the cathode biasing resistors for these tubes, and capacitors 58 and 59 are the cathode bypass capacitors. The circuit including cathode followers 60 and 62 and gated amplifiers 64 and 66 is exactly similar in design to the circuit just described.

The output voltages from the plates of amplifiers 40, 42, 64, and 66 are applied through coupling capacitors 68, 70, 72, and 74 to the grids of triodes 76, 78, 80, and 82 respectively. Triode amplifier 76 has a grid resistor 84 and a plate resistor 86, and the output voltage from its plate is connected through coupling capacitor 88 to the plate of diode detector 90, which is connected through resistor 92 to ground. The cathode of diode 90 is connected to the plate of switch tube 94 and is also connected through storage capacitor 96 to ground. The cathode of switch tube 94 is connected to a pulse-forming line 98, the second terminal of which is grounded. Line 98 may be an artificial transmission line made up of lumped capacitive and inductive elements in such numbers and of such values as to give the line a sufficiently small delay time as is known in the art. This line may have a short circuit across the end which is remote from the switch tube so that it will rapidly discharge capacitor 96.

A periodic positive voltage pulse is applied to the control grid of switch tube 94 from range gate generator 100, and a square wave is applied to the screen grid of this tube at point a' from point a at the control grid of pentode 64, through an amplifier 141. Range gate generator 100 may be any circuit capable of generating a gate or voltage pulse of short duration having a pulse repetition frequency equal to that of the transmitter and capable of being delayed so that it will occur at any given time after the transmitted pulse. The generator may consist of a first multivibrator triggered by a portion of the transmitted pulse, which is obtained from the transmitting system 20, producing pulses whose width may be varied by varying the bias on one of the vacuum tubes by means of range handwheel 101 connected to a potentiometer (not shown), and a second multivibrator coupled to the first through a differentiating or peaking circuit, and triggered by the trailing edges of the pulses from the first multivibrator.

An arrangement essentially similar to that just described and suitable for use as range gate generator 100 is shown in Fig. 1 and as units 116 and 136 of Fig. 2 in Br. Patent 511,733, August 23, 1939, Convention date (United States) November 29, 1937.

The circuits including triodes 78, 80, and 82, diode detectors 102, 103, and 104, storage capacitors 105, 106, and 107, and switch tubes 108, 110, and 112 are exactly similar to the circuit including triode 76, diode 90, and switch tube 94 which has just been described. The square waves applied to the screen grids of switch tubes 108, 110, and 112 are obtained through amplifiers 142, 143 and 144 from the control grids of pentodes 66, 42, and 40 respectively as shown by the correspondence of the letter designations on these points.

Range gate generator 100 also supplies its output to gated amplifier 114, to which is also applied the output of receiving system 22. Gated amplifier 114 is an amplifier so designed that it will pass and amplify video signals applied to its input only when a second input, usually in the form of a periodic voltage pulse, is applied to it. The gated output from gated amplifier 114 is then applied to the screen grids of pentodes 40, 42, 64, and 66.

Gated amplifier 114 is shown in block representation since the drawing shows schematically a number of other amplifiers which are operative only when a gate signal is applied as will presently be described. For example tubes 40, 42, 64 and 66 operate as gated amplifiers.

Three cathode ray indicator tubes are provided, a range indicator 116, an elevation indicator 118, and an azimuth indicator 120. To one pair of deflection plates of each of these tubes, namely pairs 121, 122, and 123 respectively, is applied from generator 145 a conventional sawtooth sweep voltage, having the same repetition frequency and initiated at the same time as the transmitted pulse. To the vertical deflection plates 124 of range indicator 116 is applied the output from receiving system 22. The positive pulses from pulse-forming line 98 are applied to the upward deflection plate 125 of elevation indicator 118, while pulses from pulse-forming line 132 are applied to the downward deflection plate 126 of the same indicator. Similarly positive pulses from pulse-forming line 134 are applied to the left deflection plate 127 of azimuth indicator 120, and pulses from pulse-forming line 136 are applied to the right deflection plate 128 of the same indicator.

Reference is now made more particularly to Fig. 2 which shows the path traced by the axis of the rotating beam from the antenna as it would appear from a point behind the antenna. As shown by the arrows, the direction of rotation is counter-clockwise about the antenna axis as a center. During that portion of the cycle designated as U, the received pulses are used to charge capacitor 96 of Fig. 1. During that portion of the cycle designated as D, capacitor 105 is similarly charged, while those portions of the cycle designated as L and R are used to charge capacitors 106 and 107 respectively.

When the system of Fig. 1 is in operation, the beam of antenna 10 and the rotor of two-phase generator 26 are caused to rotate in unison. By proper orientation of the rotor, the positive and negative peaks of one of the generator outputs are made to coincide respectively with the maximum up and down displacements of the beam while the positive and negative peaks of the other generator output correspond respectively to the maximum left and right displacements of the beam.

These sine wave outputs from generator 26 are applied through transformers 28 and 30 to the grids of cathode follower triodes 31, 32, 60 and 62 in such a manner that the grid of triode 31 tends to be driven positive by the voltage peak occurring simultaneously with the maximum upward displacement of the antenna beam. Similarly, the grids of triodes 32, 60, and 62 tend to be driven positive in synchronism with the maximum downward, left, and right displacements of the antenna beam respectively, as shown by the labeling of the diagram of Fig. 1. All four of these triodes are biased so that they are below cutoff when no signal is applied to the grid; hence, only the most positive portions of the input sine wave cause conduction and the output wave form is flattened on the lower side. The bias on the cathode follower triodes is adjusted to be such that conduction will occur only during less than one-fourth cycle of the input sine wave voltage and more particularly during one of the four portions of the cycle indicated in Fig. 2.

The positive pulses of voltage occurring at the cathode of triode 31 when this vacuum tube conducts are applied to the control grid of gated amplifier 40. The bias on the cathode of amplifier 40 is produced in the conventional way by means of cathode biasing resistor 56 and capacitor 58. When the voltage on the control grid exceeds this bias voltage, grid current flows and causes the control grid voltage wave form to be somewhat flattened on its peak due to the flow of current through clipping resistor 46, and the resulting wave form is then substantially rectangular. Video echo pulses from a selected target which are supplied by gated amplifier 114, the operation of which will be described later, are applied to the screen grid of gated amplifier 40. These pulses only pass through this pentode, however, when the voltage supplied by cathode follower 31 is present on the control grid.

The gated video output from pentode 40 is amplified in triode 76 and applied to the plate of diode 90. Since the output from triode 76 is a series of positive going pulses, diode 90 conducts each time a pulse occurs and causes charge to be placed on capacitor 96. This process continues for the duration of the period marked U in Fig. 2, and capacitor 96 continues to accumulate charge, since diode 90 will not conduct in the opposite direction and switch tube 94 is cut off. The operation of the other three channels is analogous to that just described and capacitors 105, 106, and 107 accumulate charge in the same manner, except that their charging periods are D, L, and R respectively.

The positive going square wave at point $a$ on the control grid of pentode 64 begins shortly after the end of period U, which is the charging period for capacitor 96. This square wave is applied through an amplifier 141 to point $a'$ on the screen grid of switch tube 94. A series of range gate pulses is continuously supplied from range gate generator 100, each one lagging a transmitted pulse by a time interval proportional to the range of the selected target, as determined by the setting of range handwheel 101, and hence occurring at the same time an echo pulse is received from this target. When pulses are present on both the screen and control grid of switch tube 94, this tube will conduct, and hence during the first range gate pulse occurring after the square wave is applied to point $a'$, this tube conducts and allows capacitor 96 to discharge through pulse-forming line 98.

The electron beam of elevation indicator 118 is swept horizontally across the face of the tube by the sawtooth range sweep voltage once for each radiated pulse from the transmitter. The single pulse resulting from the discharge of capacitor 96 through pulse-forming line 98 is applied to the upward deflection plate 125 of elevation indicator 118, and results in an upward deflection of the cathode ray tube beam at a position corresponding to the range of the target.

In a similar fashion pulses from pulse-forming line 132 which occur when the antenna beam is 180° further along its path of rotation are used to deflect the beam of elevation indicator 118 in a downward direction at the same point on the sweep trace. Azimuth indicator 120 presents a similar picture except that its range sweep is made vertically and the pulses are used to deflect the beam in a horizontal direction, the pulses being from pulse-forming lines 134 and 136.

The range sweep voltage is also applied to deflect the beam of range indicator 116 horizontally and the entire series of echo pulses from the receiver is applied to deflect the beam vertically so that all targets within the range and sensitivity limits of the system are indicated along its sweep trace. Range gate generator 100 supplies a voltage pulse of the same repetition frequency as the transmitted pulses and of a duration slightly larger than that of the average echo pulse. The amount of delay between the transmitted pulse and the range gate pulse may be varied as previously described, so that the range pulse may be caused to occur at the same instant as an echo pulse from any target selected from those appearing on the range indicator. This range gate pulse is applied to the range indicator 116 to deflect the beam vertically, and in this way the coincidence of the range gate pulse with a selected target echo may be observed on the range indicator.

The entire series of echo pulses from receiving system 22 and the range gate pulses are both applied to gated amplifier 114. Since signals are passed only when this amplifier is rendered sensitive by the presence of the range gate pulse, only the echo pulses from the target with which the range gate pulse coincides are amplified and applied to gated amplifier tubes 40, 42, 64, and 66 as previously described.

If the selected target is not directly on the antenna axis about which the beam rotates, the echo pulses returned from the target will be of different magnitudes during the several portions of the beam rotation cycle. The charges accumulated on capacitors 96, 105, 106, and 107 vary directly as the average magnitude of the charging pulses, and the displacements applied to the indicating tube from the pulse-forming lines vary directly as the amount of charge which is accumulated on these capacitors during the charging period. Hence by observing the relative sizes of the pulse-formed displacements occurring on the indicating tubes an observer may adjust the antenna 10 in elevation and azimuth until the right and left displacements are equal and the upward and downward displacements are equal. This equality indicates that the antenna is pointing directly at the target and the returning echo pulses are all of equal magnitude. One of the principal advantages of the method of storing or integrating the energy of a series of returning echo pulses to form one single pulse in the manner described above is that increased sensitivity is obtained. Due to the effect of the range gate, only the energy of the selected pulses has any part in charging the storage capacitors and no interference from other targets, noise, or other object locating transmitters is allowed to pass to the azimuth and elevation indicator tubes. This increased sensitivity is obtained without any increase of noise interference and permits more accurate comparison of the magnitude of the various displacements for purposes of properly orienting the antenna.

From the above description it will be evident that in accordance with the present invention in a pulsed radar system of the type which employs a conical scanning antenna having a direction axis and which includes means for receiving echo pulses from a chosen lamina of range; there is provided means synchronously operated with the scanning rate for separating the pulses received during a successive plurality of intervals of the scanning cycle into a corresponding plurality of signal channels, means in each of the channels for integrating the pulses received during an interval, means actuated at the termination of the interval and in synchronism with the received pulse for utilizing the integrated pulses to generate a single pulse and means for displaying the single pulse to provide a component indication of the direction and amount of error of the direction axis of the antenna relative to the direction of arrival of the echo pulses. Also the display means provided is adapted to display the single pulses from a pair of channels corresponding to oppositely disposed intervals of the scanning cycle to provide component indications for one reference direction of the sense and amount of error of the direction axis relative to the direction of arrival of the echo pulses.

While there has been described what is at present considered to be the preferred embodiment of this invention, it will be obvious to those skilled in the art that various changes and modifications may be made therein without departing from the scope of the invention as set forth in the appended claims.

The invention claimed is:

1. In combination, means for transmitting a directive beam of electromagnetic pulses, means for rotating said beam about an axis, means for orienting said axis, means for receiving echo pulses from surrounding reflecting objects, generator means responsive to the rotation of said beam for generating two sinusoidal voltages in quadrature with respect to each other, squaring means connected to said generator means for producing from said sinusoidal voltages a plurality of gate voltages, and at least one selector means operatively controlled by said squaring means to select from the entire series of echo pulses returned by a single selected target a group of pulses which occur during a given portion of the cycle of rotation of said beam, means including a storage capacitor connected to said selector means for utilizing said group of pulses to charge said storage capacitor, a plurality of cathode ray indicating means, means for discharging said storage capacitor periodically at the end of said portion of the cycle through a pulse forming line and means applying the resulting voltage pulse to one of said indicating means, to indicate a component displacement of said selected target from said axis.

2. In combination, means for transmitting a directive beam of pulses, said beam being at an acute angle to an axis, means for rotating said beam about said axis, means for orienting said axis, means for receiving echo pulses from reflecting objects, means for providing output pulses corresponding to the pulses from reflecting objects located within a selected lamina of range, means for selecting from said output only the pulses occurring during each of a predetermined plurality of arcs of the circle of rotation of said beam about said axis, a plurality of storage means each for storing the energy of the output pulses occurring during one of said arcs, pulse forming means, means for discharging each of said storage means through said pulse-forming means after the end of the corresponding arc of rotation to provide a single pulse, indicating means, and means for applying said single pulse thereto to indicate the integrated magnitude of the selected echo pulses received during the corresponding arc of rotation.

3. In combination, means for transmitting a directive beam of electromagnetic pulses, means for rotating said beam about an axis, means for orienting said axis, a storage capacitor, means synchronously operative with the rotation of said beam for utilizing the echo pulses from a selected target received during a given portion of the rotation cycle of said beam to charge said capacitor, a pulse forming line, means for discharging said storage capacitor cyclically at the end of said portion of the rotation cycle into said pulse forming line to produce a cyclically recurrent voltage pulse, and means for displaying said pulse to provide a component indication of the displacement of said selected target from said axis.

4. In a pulsed radar system of the type which employs a conical scanning antenna having a direction axis and which includes means for receiving echo pulses from a chosen lamina of range; means synchronously operative with the scanning rate for separating the pulses received during four successive intervals of the scanning cycle into four corresponding signal channels, means in each of said channels for integrating the pulses received during an interval, means actuated at the termination of said interval and in synchronism with a received pulse for utilizing said integrated pulses to generate a single pulse and means for displaying the single pulses from a pair of said channels corresponding to an alternate pair of said intervals to provide component indications for one reference direction of the sense and amount of error of said direction axis relative to the direction of arrival of said echo pulses.

5. In a pulsed radar system of the type which employs a conical scanning antenna having a direction axis and which includes means for receiving echo pulses from a chosen lamina of range; means synchronously operative with the scanning rate for separating the pulses received during an even number of successive intervals of the scanning cycle into a corresponding number of signal channels, means in each of said channels for integrating the pulses received during an interval, means actuated at the termination of said interval and in synchronism with a received pulse for utilizing said integrated pulses to generate a single pulse and means for displaying the single pulses from a pair of said channels corresponding to an oppositely disposed pair of said intervals of the scanning cycle to provide component indications for one reference direction of the sense and amount of error of said direction axis relative to the direction of arrival of said echo pulses.

6. In a pulsed radar system of the type which employs a conical scanning antenna having a direction axis and which includes means for receiving echo pulses from a chosen lamina of range; means synchronously operative with the scanning rate for separating the pulses received during a successive plurality of intervals of the scanning cycle into a corresponding plurality of signal channels, means in each of said channels for integrating the pulses received during an interval, means actuated at the termination of said interval and in synchronism with a received pulse for utilizing said integrated pulses to generate a single pulse and means for displaying the single pulse on a time scale to represent the range and to provide a component indication of the direction and amount of error of said direction axis relative to the direction of arrival of said echo pulses.

7. In a pulsed radar system of the type which employs a conical scanning antenna having a direction axis and which includes means for receiving echo pulses from a chosen lamina of range; means synchronously operative with the scanning rate for separating the pulses received during a successive plurality of intervals of the scanning cycle into a corresponding plurality of signal channels, means in each of said channels for integrating the pulses received during an interval, means actuated at the termination of said interval and in synchronism with a received pulse for utilizing said integrated pulses to generate a single pulse and means for displaying the single pulse to provide a component indication of the direction and amount of error of said direction axis relative to the direction of arrival of said echo pulses.

KENNETH T. BAINBRIDGE.

REFERENCES CITED

The following references are of record in the file of this patent:

UNITED STATES PATENTS

| Number | Name | Date |
|---|---|---|
| 2,403,562 | Smith | July 9, 1946 |
| 2,405,930 | Goldberg et al. | Aug. 13, 1946 |
| 2,412,669 | Bedford | Dec. 17, 1946 |
| 2,412,702 | Wolff | Dec. 17, 1946 |
| 2,423,661 | Rhea | July 8, 1947 |
| 2,464,822 | Mallett | Mar. 22, 1949 |
| 2,530,060 | Holdam | Nov. 14, 1950 |

FOREIGN PATENTS

| Number | Country | Date |
|---|---|---|
| 873,067 | France | June 29, 1942 |